(12) United States Patent
Gori

(10) Patent No.: US 9,794,023 B2
(45) Date of Patent: Oct. 17, 2017

(54) DETECTION OF ACTIVE SPREADING CODES AND MODULATION SCHEMES

(71) Applicant: Intel IP Corporation, Santa Clara, CA (US)

(72) Inventor: Silvano Gori, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/865,159

(22) Filed: Sep. 25, 2015

(65) Prior Publication Data

US 2016/0119005 A1    Apr. 28, 2016

(30) Foreign Application Priority Data

Oct. 24, 2014   (DE) .................. 10 2014 115 527

(51) Int. Cl.
*H04B 1/69* (2011.01)
*H04L 1/00* (2006.01)
*H04J 11/00* (2006.01)

(52) U.S. Cl.
CPC ........ *H04L 1/0009* (2013.01); *H04J 11/0036* (2013.01)

(58) Field of Classification Search
CPC . H04B 1/7075; H04B 1/7093; H04J 13/0044; H04L 1/0038
USPC ............... 370/342; 375/147, E1.002, E1.003
See application file for complete search history.

(56) References Cited

U.S. PATENT DOCUMENTS

| | | | |
|---|---|---|---|
| 7,151,761 B1 | 12/2006 | Palenius | |
| 8,767,799 B2 | 7/2014 | Wang et al. | |
| 2008/0225928 A1* | 9/2008 | Law ................... | H04B 1/7075 375/147 |
| 2009/0245219 A1 | 10/2009 | McKown | |
| 2013/0142183 A1* | 6/2013 | Lee ..................... | H04W 24/02 370/338 |

FOREIGN PATENT DOCUMENTS

DE         69107155 T2    5/1995

OTHER PUBLICATIONS

Office Action dated Oct. 27, 2016 for Taiwanese Patent Application No. 10521328560 (with English translation).
G. Ren et al., "A new SNR's Estimator for QPSK Modulations in an AWGN Channel", IEEE Transactions on Circuits and System II: Express Briefs vol. 52, No. 6, Jun. 2005.

\* cited by examiner

*Primary Examiner* — David S Huang
(74) *Attorney, Agent, or Firm* — Schiff Hardin LLP

(57) ABSTRACT

A channelization code analyzer for determining active channelization codes includes a despreading unit configured to despread a received signal with a plurality of candidate channelization codes to generate a plurality of despreaded signals. The channelization code analyzer further includes a detector configured to detect from the plurality of despreaded signals a set of despreaded signals modulated with a predetermined first modulation scheme. A channelization code identification unit is configured to identify at least one active channelization code from the plurality of candidate channelization codes based on the detected set of despreaded signals. Further, a radio receiver apparatus, a second moment and fourth moment processing unit and a modulation scheme detector are described.

9 Claims, 8 Drawing Sheets

DETECTION OF ACTIVE SPREADING CODES AND MODULATION SCHEMES

TECHNICAL FIELD

Embodiments described herein generally relate to the field of radio communications, and more particularly to the technique of detecting active spreading codes and/or modulation schemes in radio receivers of radio networks, in particular cellular radio networks.

BACKGROUND

Radio networks use channelization to separate different physical channels over which signals are transmitted. Channelization codes used by the base station(s) for transmitting signals to other users are often unknown to a specific user. In general, knowledge about channelization codes allocated to other users could be beneficial for a specific user.

By way of example, the cellular performance of a radio receiver may be limited by interference from signals assigned to other users. Reducing this interference can improve the signal to noise ratio at the receiver and may improve the data throughput. One way of reducing this interference could rely on reconstructing the signals assigned to other users and to subtract the reconstructed signals from the received signal. Signal reconstruction, however, requires some knowledge about the active channelization codes allocated to other users.

For these and other reasons there is a need for the present invention.

BRIEF DESCRIPTION OF THE DRAWINGS

The accompanying drawings are included to provide a further understanding of examples of the disclosure and are incorporated in and constitute a part of this specification. The drawings illustrate examples and together with the description serve to explain principles of examples. Other examples and many of the intended advantages of examples will be readily appreciated as they will become better understood by reference to the following detailed description.

DESCRIPTION OF EMBODIMENTS

Figure 1:
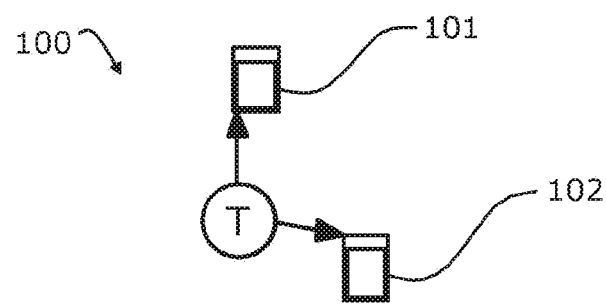
FIG. 1 is a schematic diagram illustrating multi-user interference in a radio network.

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding identical or similar parts.

As employed in this specification, the terms "coupled" and/or "connected" are not meant to mean in general that the elements must be directly coupled or connected together; intervening functional elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments may be implemented on a single semiconductor chip or on multiple semiconductor chips connected to each other. Furthermore, it should be understood that embodiments may be implemented in software or in dedicated hardware or partially in software and partially in dedicated hardware.

The channelization code analyzers, radio receiver apparatus, second moment and fourth moment processing units and modulation scheme detectors described herein may be used for various wireless communication networks such as, e.g., Code Division Multiple Access (CDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. Further, the radio receiver apparatus, second moment and fourth moment processing units and modulation scheme detectors described herein may be used for networks such as, e.g., Time Division Multiple Access (TDMA), Frequency Division Multiple Access (FDMA), Orthogonal FDMA (OFDMA) and Single Carrier FDMA (SC-FDMA) networks. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). A 3GPP Long Term Evolution (LTE) network, which is based on the GSM/EDGE and UMTS/HSPA (High Speed Packet Access) technologies, includes radio receiver apparatus configured for operation in accordance with the LTE standard.

By way of example, a radio network considered herein may be a WCDMA (Wideband CDMA) system defined by the 3GPP ($3^{rd}$ Generation Partnership Project). WCDMA uses DS-CDMA (Direct Sequencing-CDMA) channel access method and a FDD duplexing method to achieve higher speeds and to support more users.

By way of example, a radio network considered herein may be a cellular radio network such as, e.g., UMTS including developments such as, e.g., HSPA (High-Speed Packet Access) and/or, in particular, HSDPA (High-Speed Downlink Packet Access). HSDPA is an enhanced 3G (third generation) mobile telephony communications protocol in the HSPA family, and is also referred to as 3.5G, 3G+ or Turbo 3G in the art. Further, HSDPA evolutions such as, e.g., DC-HSDPA (Dual Carrier-HSDPA) using carrier aggregation in the downlink may be considered herein.

By way of example, a radio network considered herein may use adaptive modulation. The modulation may be changed on a per-user basis. For example, symbols of a received symbol stream may be modulated according to a Quadrature Amplitude Modulation (QAM) modulation scheme, a Binary Phase Shift Keying (BPSK) modulation scheme, a Quadrature Phase Shift Keying (QPSK) modulation scheme, a 8QAM modulation scheme, a 16-QAM modulation scheme, a 64-QAM modulation scheme or any other suitable modulation scheme. By way of example, in HS-DPA, QAM, 16-QAM, and 64-QAM may be available.

By way of example, a radio network considered herein may use adaptive channelization, e.g. adaptive coding for channelization. The channelization, e.g. the channelization codes, may be changed on a per-user basis. Spreading codes (channelization codes) may be used for adaptive coding. In particular, OVSF (Orthogonal Variable Spreading Factor) codes may be used. In OVSF, spreading codes are used as channelization codes and are chosen to be mutually orthogonal to each other. Each user is allocated a different, unique spreading code. These codes are also referred to as user codes or subscriber codes in the following.

Spreading codes, in particular OVSF codes, may be derived from a code tree. Each channelization code of the code tree may be uniquely labeled by a pair of indices (SF,c) comprising a spreading factor SF and a code index c, with $0 \leq c \leq SF-1$. Each code of the code tree with $SF \geq 2$ may have a predecessor code (parent code). Each code of the code tree with $SF \leq 128$ may have two descendent codes (child codes). The maximum SF may, e.g., be SF=256.

A channelization code of spreading factor SF may be represented by a sequence of SF chips. The number of codes for each SF may be equal to SF (and thus to the code length). Any two codes of the same SF are orthogonal. Any two codes of different SF are orthogonal except when one of the two codes is a parent code of the other. Any two non-orthogonal codes are not chosen by the network as active codes at the same time.

In the following the terms "mobile station" and "UE" (User Equipment) shall have the same meaning, which meaning shall comprise the definitions given in the various standards (e.g. UMTS and derivatives thereof). By way of example, a UE may be represented by a cellular phone, a smartphone, a tablet PC, a laptop, test equipment such as, e.g. a channel or spectrum analyzer, etc. Further, in the following the terms "base station" and "NodeB" shall have the same meaning, which meaning shall comprise the definitions given in the various standards.

FIG. 1 illustrates an exemplary network 100 comprising a transmitter T (e.g. base station, satellite, etc.) and a plurality of terminals, which are referred to as UEs in the following and of which exemplary UE 101 and exemplary UE 102 are depicted in FIG. 1. UE 101 may be the target UE under consideration, and UE 102 may be the UE of another user (subscriber). The network 100 may be of any type, e.g. a cellular network, a satellite based network, etc. The network 100 typically uses differently coded signals for UE 101 and UE 102 to reduce multi-user interference. However, in some real scenarios, target UE 101 may nevertheless be interfered by a signal transmitted by transmitter T to the other UE 102.

Figure 2:
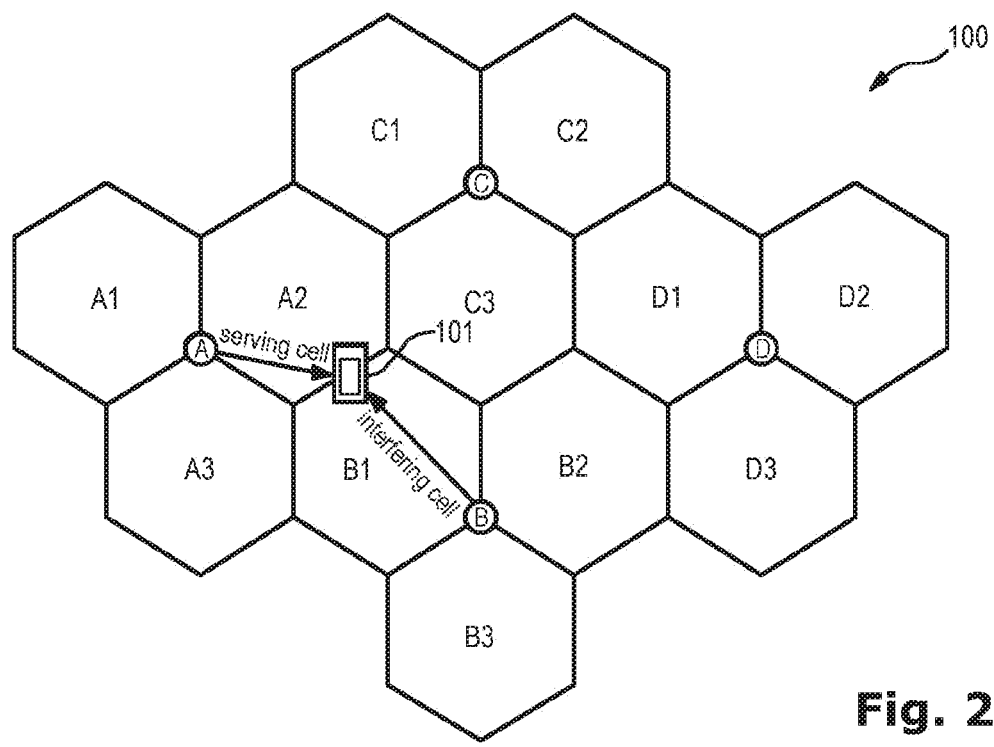
FIG. 2 is a schematic diagram illustrating a first cell boundary scenario in a cellular radio network.

Referring to FIG. 2, the exemplary network 100 is, by way of example, a cellular radio network 100. The cellular radio network 100 may include several base stations (NodeB) referred to as A, B, C, D, . . . and a plurality of user terminals, of which the target UE 101 is depicted in FIG. 2.

The cellular radio network 100 is composed of cells, wherein each cell is served by a base station A, B, C, D, . . . . By way of example, cells A1, A2, A3 are served by base station A, cells B1, B2, B3 are served by station B, cells C1, C2, C3 are served by base station C, and cells D1, D2, D3 are served by base station D.

Cells served by different base stations (e.g. A1, B1) typically use differently coded signals in order to reduce interference from neighboring cells. Coding, in this context, shall have a broad meaning including time division coding, frequency division coding, scrambling, spreading, etc. By way of example, considering, e.g., a WCDMA cellular radio network 100, signals from different base stations A, B, C, D are encoded by different scrambling codes.

Target UE 101 is located near to a cell boundary. By way of example, cell A2 is the serving cell and cell B1 is an interfering cell. That is, UE 101 uses the scrambling code allocated to base station A in order to detect the signals of the serving cell. The scrambling code allocated to base station B is different from the scrambling code allocated to base station A.

Figure 3:
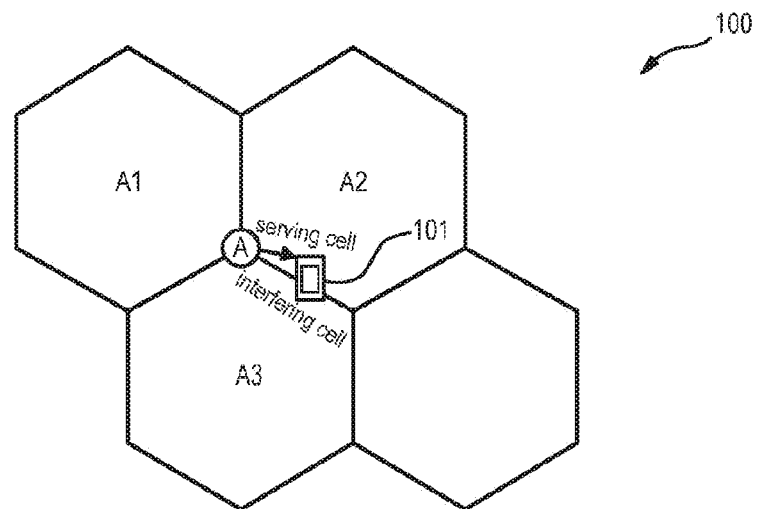
FIG. 3 is a schematic diagram illustrating a second cell boundary scenario in a cellular radio network.

FIG. 3 illustrates another cell boundary scenario. Here, the UE 101 is located near to the cell boundary of cells A2 and A3 served by the same base station A. That is, in this example, cells are sectors of the same base station A. By way of example, cells A1, A2 and A3 served by base station A are generated by directional antennas with, e.g., a 120° radiation pattern. Cell A2 is the serving cell and A3 is the interfering cell. If the transmitted power of the serving cell A2 and the interfering cell A3 is the same, a carrier to interference ratio (Ior/Ioc) of 0 dB may be obtained.

In all scenarios of FIGS. 1 to 3 the data throughput may not be limited by low signal strength due to path losses but by interference from signals assigned to other UEs 102 of the network, in particular to other UEs 102 of the interfering cell(s) or the serving cell. Reducing or even removing this interference may improve the signal-to-noise ratio at the target UE 101 (e.g. comprising the radio receiver apparatus under consideration) and may increase the data throughput and overall network capacity.

It is to be noted that the term "cell" as used herein may have a broad meaning. It may comprises both the meaning of a cell sector A1 or A2 or A3 or B1, . . . and the meaning of a cell spanned by one base station, e.g. one cell composed of cell sectors A1, A2, A3. In the first case cell boundaries are defined by cell sector boundaries (FIG. 3) and boundaries of cells of different base stations (FIG. 2) whereas, in the second case, cell boundaries are only defined by boundaries of cells of different base stations (FIG. 2).

Figure 4:
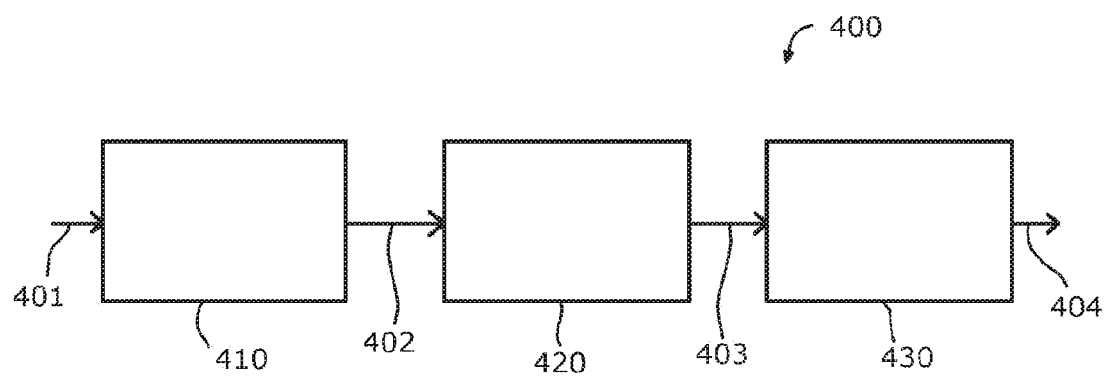
FIG. 4 is a block diagram illustrating an exemplary implementation of a channelization code analyzer for determining active channelization codes in accordance with the disclosure.

FIG. 4 illustrates, by way of example, a block diagram of an exemplary channelization code analyzer 400 for distinguishing between active channelization codes and inactive channelization codes. The channelization code analyzer 400 may comprise a despreading unit 410, a detector 420 and a channelization code identification unit 430.

The despreading unit 410 may be configured to despread a signal 401 received at an input of the despreading unit 410 by a plurality of candidate channelization codes to generate a plurality of despreaded signals 402, each despread by one of the candidate channelization codes. The signal 401 may be output by a frontend (not shown) of a UE (e.g. target UE 101) in which the channelization code analyzer 400 may be implemented. The frontend may comprise one or more antennas and an RF (radio frequency) stage (not shown). The RF stage may be configured to down-convert a received antenna signal into an intermediate band or baseband. The down-converted signal may then be equalized by an equalizer (not shown). The received signal 401 may, for example, correspond to an equalized signal received from such frontend/equalizer structure. The received signal 401 may, e.g., be an output signal of an equalizer.

The plurality of despreaded signals 402 are coupled to an input of the detector 420. The detector 420 may be configured to detect from the plurality of despreaded signals 402 those despreaded signals modulated with a predetermined first modulation scheme.

Thus, for each despreaded signal of the plurality of despreaded signals 402, the detector 420 may be configured to determine whether or not the despreaded signal is modulated with the predetermined first modulation scheme. The detector 420 outputs modulation indicator signal 403, which includes this information. By way of example, modulation indicator signal 403 may be a binary signal indicating, for each of the channelization codes (e.g. spreading codes) used in despreader unit 410 for generating the corresponding despreaded signal, whether or not the despreaded signal is modulated with the predetermined first modulation scheme.

The modulation indicator signal 403 may be received by the channelization code identification unit 430. The channelization code identification unit 430 may be configured to identify at least one active channelization code from the candidate channelization codes based on the despreaded signals detected by the detector 420 and provided to the channelization code identification unit 430. Active code identification signal 404, as output by the channelization code identification unit 430, may comprise information on which of the candidate channelization codes is an active channelization code.

It is to be noted that the criterion that a despreaded signal is modulated with the predetermined first modulation scheme (and thus shows up in the modulation indicator signal 403) is a necessary but does not have to be a sufficient condition for being identified as an active channelization code in channelization code identification unit 430 (and thus for showing up as an active channelization code in active code identification signal 404). In other words, the channelization codes indicated by active code identification signal 404 as active codes may be a subset of the set of channelization codes indicated by modulation indicator signal 403 as being modulated with the first predetermined modulation scheme.

Generally, if only an approximate or coarse knowledge about active/inactive channelization codes is needed, the modulation indicator signal 403 may be identically used as the active code identification signal 404. In other cases, when the subset of active codes should be determined more precisely from the set of codes modulated with the predetermined first modulation scheme, other criteria such as, e.g., consistency checks, etc. may be applied in channelization code identification unit 430 to identify the actually active codes from the codes actually modulated by the predetermined first modulation scheme. Exemplary criteria which may be applied by the channelization code identification unit 430 will be described further below.

In the following, without loss of generality and merely in order to provide a specific example, the predetermined first modulation scheme may be QPSK and the channelization codes may be the channelization codes (spreading codes) of the OVSF tree in WCDMA. The candidate channelization codes used for despreading the received signal 401 in the despreading unit 410 may, e.g., be all or a sufficiently great part of the 511 channelization codes of the OVSF code tree. For example, the candidate channelization codes may, e.g., be all 511 codes of the OVSF tree except the codes of SF=16 (which are reserved for the HS-PDSCH (High Speed-Physical Downlink Shared CHannel) and are known to be QPSK or 16-QAM or 64-QAM modulated) and, optionally, without the channelization codes having SF=1 and/or SF=2, because these spreading factors are not allowed to be used, and/or without the channelization codes having SF=4 and/or SF=8, because these low processing gain codes are rarely used in real scenarios. In other words, although all channelization codes of the code tree may be used as candidate channelization codes, this is not mandatory and there may also be additional criteria which could be applied to reduce the number of candidate channelization codes compared to the number of existing channelization codes (e.g. 511 codes existing in the OVSF tree).

According to the 3GPP Standard, at least in WCDMA systems, physical channels other than HS-PDSCH carry two bits per symbol and are QPSK-modulated. This property may be exploited to distinguish between active and inactive codes of the OVSF tree in channelization code analyzer 400. That is, channelization code analyzer 400 may rely on the concept to first find the QPSK-modulated channelization codes from the candidate channelization codes and then to find the active channelization codes from the QPSK-modulated channelization codes.

The code detection algorithm applied in detector 420 may be based on an estimation of the second moment ($M_2$) and the fourth moment ($M_4$) of each despreaded signal of the plurality of despreaded signals 402. The first predetermined modulation scheme detection of all of the plurality of despreaded signals 402 may be periodically repeated by detector 420. Thus, an updated modulation indicator signal 403 may be output by detector 420 each detection period. By way of example, the detection period may correspond to one or more half-slots of the radio network. By way of example, in WCDMA a slot corresponds to 2560 chips (half-slot: 1280 chips) with a chip rate of 3.84 Mcps and a frame length of 10 ms, with a number of 15 slots per frame. Further, by way of example, in WCDMA systems each despreaded signal of the plurality of despreaded signals 402 may be QPSK-modulated, 16-QAM-modulated or 64-QAM-modulated, with 2, 4 and 6 bits encoded per symbol, respectively.

Figure 5:
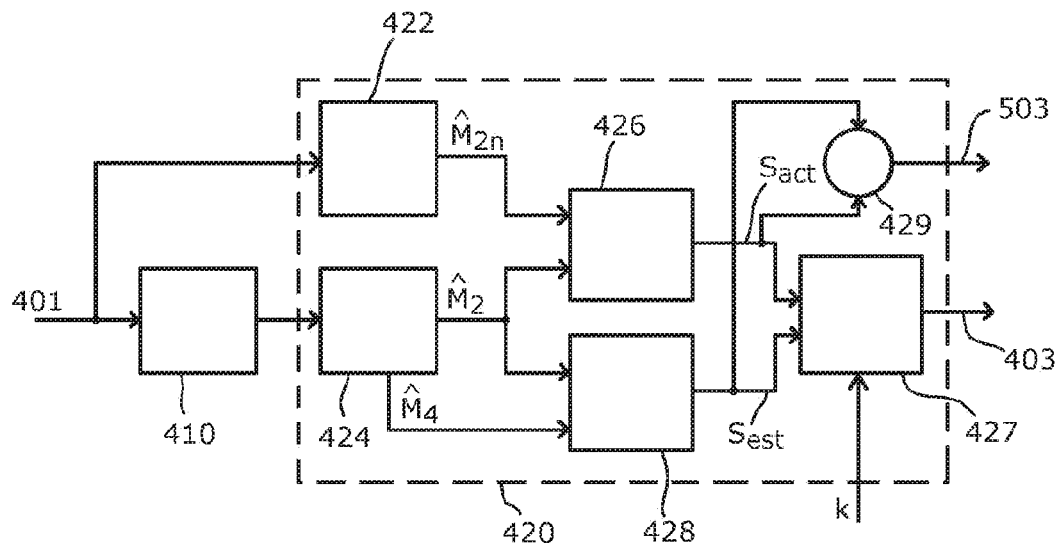
FIG. 5 is a block diagram illustrating an exemplary implementation of a detector having a $M_2/M_4$ estimator in accordance with the disclosure.

FIG. 5 is an exemplary implementation of the detector 420 of the channelization code analyzer 400. The detector 420 may, e.g., include a noise power measurement unit 422, a second moment ($M_2$) and fourth moment ($M_4$) estimator 424, a first signal power estimator 426 and a second signal power estimator 428. Further, the detector 420 may, e.g., include a comparator 427 and/or a distance metric unit 429.

The noise power measurement unit 422 may be configured to estimate the (total) noise power $\hat{M}_{2n}$ of the received signal 401, that is, e.g., the noise power at an equalizer output. The noise power estimates $\hat{M}_{2n}$ could be obtained in various ways. For example, the noise power estimates $\hat{M}_{2n}$ could be derived from the despreaded CPICH (Common PIlot CHannel) symbols using, e.g., a maximum likelihood estimator. Another possibility to obtain noise power estimates $\hat{M}_{2n}$ is to use an $M_2/M_4$ estimator applied to the channelization code corresponding to the CPICH channel (i.e. spreading factor SF=256, code index c=0):

$$S = \sqrt{2 \cdot \hat{M}_2^2 - \hat{M}_4}$$

$$\hat{M}_{2n} = \hat{M}_2 - S \quad (1)$$

wherein $\hat{M}_2$ is the second moment of the despreaded CPICH symbols and corresponds to the total (i.e. signal plus noise) power of the despreaded CPICH symbols, $\hat{M}_4$ is the fourth moment of the despreaded CPICH symbols, S corresponds to the power of the signal component of the despreaded CPICH symbols and $\hat{M}_{2n}$ computed by subtracting the signal power S from the total (i.e. signal plus noise) power $\hat{M}_{2n}$ of the despreaded CPICH symbols.

It is to be noted that the noise power measurement unit 422 does not have to be included in detector 420. The noise power estimates $\hat{M}_{2n}$ also be generated elsewhere in the receiver apparatus and passed to the detector 420.

Low-pass filtering and/or other post processing methods could be used to further enhance the accuracy of the noise power estimates $\hat{M}_{2n}$.

With the noise power estimate $\hat{M}_{2n}$ the detection of the predetermined first modulation scheme (e.g. QPSK modulation) for each candidate channelization code of, e.g., the OVSF tree may be based on comparing an estimated first signal code power $S_{act}$ with an estimated second signal code power $S_{est}$. By way of example, the following equations may be used:

$$S_{act} = \hat{M}_2 - \hat{M}_{2n}$$

$$S_{est} = \sqrt{2 \cdot \hat{M}_2^2 - \hat{M}_4} \quad (2)$$

The upper equation of equation (2) for deriving $S_{act}$ results from the statistical independence of signal and noise. The lower equation of equation (2) for deriving $S_{est}$ is based on the $M_2/M_4$ estimation applicable to QPSK.

According to the exemplary implementation of FIG. 5, $M_2/M_4$ estimator 424 may be configured to estimate the second moment $\hat{M}_2$ and the fourth moment $\hat{M}_4$ of each of the despreaded candidate channelization codes. The second moment estimates $\hat{M}_2$ may be fed to the first signal power estimator 426 and to the second signal power estimator 428. The fourth moment estimates $\hat{M}_4$ may be fed to the second signal power estimator 428. While first signal power estimator 426 may be operative to compute $S_{act}$, second signal power estimator 428 is operative to compute $S_{est}$.

For each modulation scheme the ratio of $S_{act}$ and $S_{est}$ ideally has a constant known value indicative of the specific modulation scheme. By way of example, for a QPSK-modulated signal $S_{act}$ and $S_{est}$ are ideally equal or, in practice, close to each other. It can be shown that for any higher modulation order or "pseudo-modulation", $S_{act}$ is somewhat greater than $S_{est}$. The term "pseudo-modulation" used herein means the constellation formed by the despreaded symbols of those channelization codes of the code tree that are either descendants (children) of an active code or a predecessor (parent) of multiple active codes.

The property that the ratio of $S_{act}$ and $S_{est}$ is indicative for the modulation scheme leads to the definition of the following QPSK detection criterion:

$$S_{act}^2 \leq k \cdot S_{est}^2 \quad \text{QPSK is detected} \quad (3)$$

wherein k is a suitably chosen decision threshold.

Returning to FIG. 5 the decision of whether or not a signal despreaded by code (SF,c) is QPSK-modulated may be obtained by comparator 427. To that end, comparator 427 may receive the first and second signal powers $S_{act}$ and $S_{est}$, respectively. Comparator 427 may output the modulation indicator signal 403 based on equation (3).

The decision threshold k could be set at appropriate values in order to provide for a suitable detection characteristic of the predetermined first modulation scheme. The decision threshold k could, for example, be set in the middle between the (squared) power scaling factors characteristic of QPSK and 16-QAM modulations, i.e. 1 and 1/0.68, respectively:

$$k = \frac{1}{2} \cdot \left(1 + \frac{1}{0.68}\right) = 1.235 \quad (4)$$

In particular, possible ranges for k for QPSK detection may be given by the intervals [$k_{min}$, $k_{max}$], wherein $k_{min}$=1.0, 1.05, 1.1, 1.15, or 1.20 and $k_{max}$=2.0, 1.8, 1.6, 1.4, or 1.3.

The decision threshold k may be programmable. By way of example, the value of programmed k may depend on various parameters, e.g. the channel conditions, possibly expressed by the the SINR (signal-to-interference plus noise ratio). Further, the value of k may depend on the candidate channelization code (SF,c) under consideration, e.g. on SF and/or on c.

It is to be noted that the first signal power estimator 426 may be configured to output the squared signal power estimates $S_{act}^2$ and that the second signal power estimator 428 may be configured to output the squared signal power estimates $S_{est}^2$. That way, the computation of the squared root involved in the $M_2/M_4$ estimation according to equation (2) is avoided and the comparison of signal powers by comparator 427 may be performed on the squared signal powers as exemplified by equation (3).

It has turned out by simulations that a particular choice of the decision threshold k in accordance with the above description worked well under the assumption that the "pseudo-modulation" of inactive (i.e. unused) codes can be approximated by a 16-QAM or higher order modulation.

The predetermined first modulation scheme (e.g. QPSK) detection criterion described herein could be enhanced to not only provide a hard decision (true/false) of modulation indicator signal 403 but also a distance (e.g. the difference) between $S_{act}$ and $S_{est}$ or quantities related thereto, e.g. the squared signal powers thereof. Such distance may represent a reliability metric (the smaller the distance, the higher is the chance that the candidate channelization code is truly QPSK-modulated) that could be used in subsequent processing, e.g. in a code search strategy based on a maximum likelihood approach. Such distance may be computed by distance metric unit 429. Distance metric unit 429 may, for example, be implemented by a subtractor configured to derive $S_{act}-S_{est}$. Additionally, the distance metric unit 429 may divide the distance by, e.g., $S_{est}$, to obtain the normalized distance $(S_{act}-S_{est})/S_{est}$, which can be compared across channelization codes of the tree having in general different power levels, for the purpose of the aforementioned maximum likelihood based code search strategy.

Figure 6A:
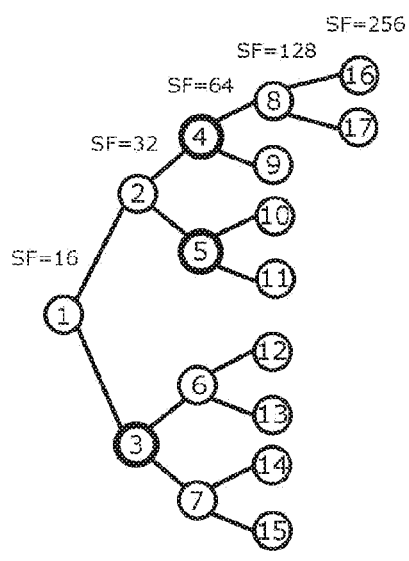
FIG. 6A is an exemplary illustration of a root portion of a spreading code tree.
Figure 6B:
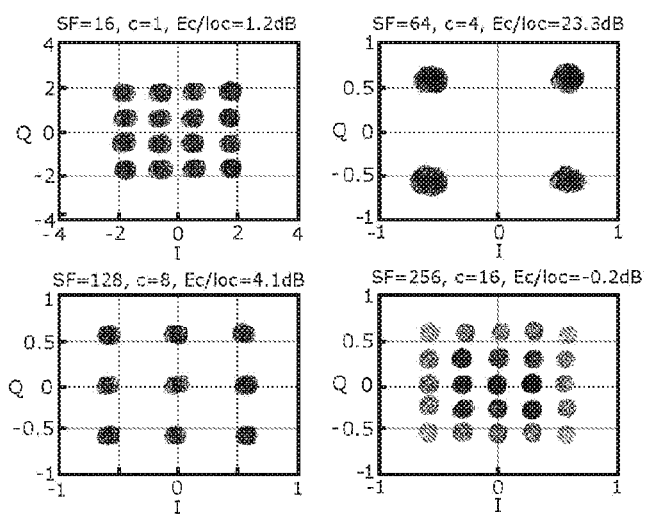
FIG. 6B is a graph illustrating simulated quadrature (Q) versus in-phase (I) representations of despreaded signals for four different spreading codes (SF,c)

FIG. 6B illustrate an example of simulated despreader output measurements at four codes of the OVSF tree having the following three active codes as illustrated in FIG. 6A: (SF=32, c=3), (SF=64, c=4) and (SF=64, c=5). Each of the active codes is QPSK-modulated and may have a power equal to ⅓. Ior/Ioc is set to 10 dB in this example. For each of the four despreaded outputs shown, Table 1 below reports the quantities involved in the QPSK detection. The simulation used k=1.235.

TABLE 1

| SF, code | $k_a = \hat{M}_4/\hat{M}_2^2$ | $S_{act}^2 = (\hat{M}_2 - \hat{M}_{2n})^2$ | $S_{est}^2 = 2 \cdot \hat{M}_2^2 - \hat{M}_4$ | $k = S_{act}^2/S_{est}^2$ | QPSK detected |
|---|---|---|---|---|---|
| 16, 1 | 1.666 | 1.003 | 0.340 | 2.953 | No |
| 64, 4 | 1.009 | 0.112 | 0.112 | 1.000 | Yes |
| 128, 8 | 1.513 | 0.028 | 0.014 | 2.035 | No |
| 256, 16 | 1.746 | 0.007 | 0.002 | 3.905 | No |

As apparent from Table 1, the algorithm would correctly identify code (SF=64, c=4) as QPSK-modulated and rule out the other codes even for values of k up to about 2.0. However, as the simulation assumed a longer averaging window for $M_2$ and $M_4$ estimation than possibly available in real systems, the determination of k may be more critical in reality and incorrect detections may occur. In real systems the averaging window may, e.g., be limited to one half-slot (or a plurality thereof) and Ior/Ioc may assume, e.g., 3 dB or less in typical use cases.

FIG. 6B illustrates simulated quadrature (Q) versus in-phase (I) representations of despreaded signals using four different spreading codes (SF,c). As apparent from FIG. 6B only the active code (SF=64, c=4) exhibits a QPSK constellation whereas the others, inactive codes (SF=16, c=1), (SF=128, c=8) and (SF=256, c=16), provide non-QPSK-like Q/I constellations.

For the example shown in FIGS. 6A, 6B, the modulation indicator signal 403 will report the active codes (SF=64, c=4), (SF=64, c=5) and (SF=32, c=3) to the channelization code identification unit 430. However, since some inactive codes may also be QPSK modulated, it is possible that also some inactive codes are detected by first modulation scheme (e.g. QPSK) detector 420 and reported to the channelization code identification unit 430. The channelization code identification unit 430 may, optionally, perform further processing, e.g. consistency checks, etc. on the reported codes in order to exclude the inactive (actually not used) codes from the active (actually used) codes. One possible strategy for distinguishing active codes from inactive codes is to compare for each reported code the two child code energies with each other. If the reported code is an active code, the code energies of the two child codes should approximately be the same. In contrast, if the code energies of the two code children are substantially different from each other, the reported code under consideration may be discarded by channelization code identification unit 430.

Figure 7:
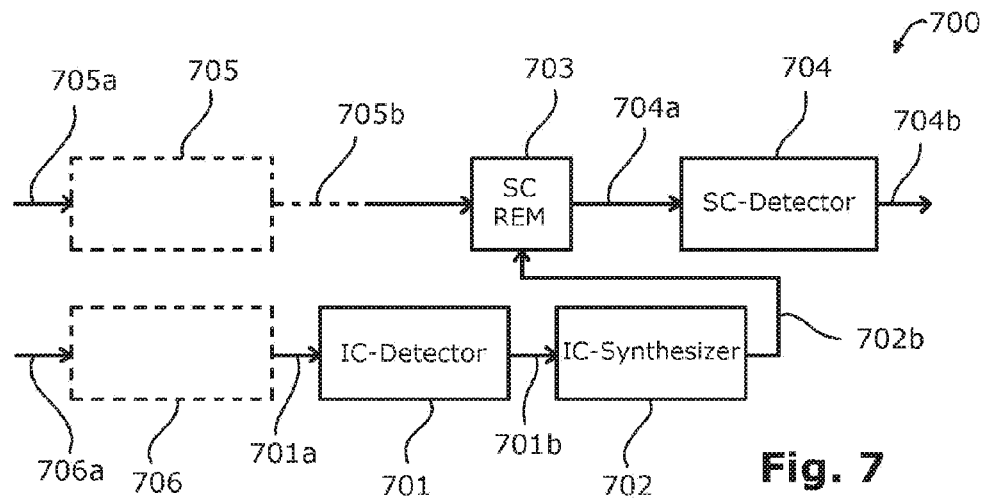
FIG. 7 is a block diagram illustrating an exemplary implementation of a radio receiver apparatus in accordance with the disclosure.

Referring to FIG. 7, the channelization code analyzer 400 described above could be utilized in many different devices and for various purposes in radio networks. Byway of example, the channelization code analyzer 400 could be implemented in a radio receiver apparatus (UE) 700 for interference cancellation.

The radio receiver apparatus 700 may comprise an interfering cell detector 701, an interfering cell synthesizer 702, a serving cell interference removing unit 703, and a serving cell detector 704. Further, the radio receiver apparatus 700 may comprise a serving cell signal processing structure 705 and an interfering cell signal processing structure 706.

The interference contained in a serving cell signal 705b output by the serving cell signal processing structure 705 is, at least partly, in nature deterministic. Therefore, it may be reconstructed and removed in the radio receiver apparatus 700.

According to FIG. 7, the interfering cell detector 701 operates on an interfering cell detector input signal 701a which may be output by the interfering cell signal processing structure 706. The interfering cell signal processing structure 706 may be similar to the serving cell signal processing structure 705 in view of implementation, and reference is made to the above description in order to avoid reiteration. However, the interfering cell signal processing structure 706 receives an interfering cell input signal 706a transmitted from the interfering cell. Further, the interfering cell signal processing structure 706 performs a signal processing matched to the interfering cell, e.g. an equalization of the interfering cell input signal 706a in order to remove signal distortions caused by the interfering cell transmission channel.

The interfering cell detector 701 may detect symbols transmitted by the interfering cell. A detected interfering cell signal 701b output from the interfering cell detector 701 may be coupled to the interfering cell synthesizer 702. The interfering cell synthesizer 702 may generate a synthesized interfering cell signal 702b based on the detected interfering cell signal 701b. The synthesized interfering cell signal 702b may correspond to a signal received at the radio receiver apparatus 700 from the interfering cell and distorted by the serving cell signal processing structure 705, i.e. may correspond to interference from the interfering cell contained in the serving cell signal 705b.

The serving cell interference removing unit 703 is configured to remove the synthesized interfering cell signal 702b from the serving cell signal 705b output by the serving cell signal processing structure 705. That way, the interference from the interfering cell contained in the serving cell signal 705b is removed. Removal of the interference from the serving cell signal 705b relies on the fact that the interference is deterministic in nature, i.e. can be detected by interfering cell detector 701.

An output of the serving cell interference removing unit 703 may be coupled to an input of the serving cell detector 704. The serving cell detector 704 is configured to generate a detected serving cell signal 704b based on a serving cell detector input signal 704a. The serving cell detector input signal 704a may be output from or derived from an output of the serving cell interference removing unit 703.

Figure 8:
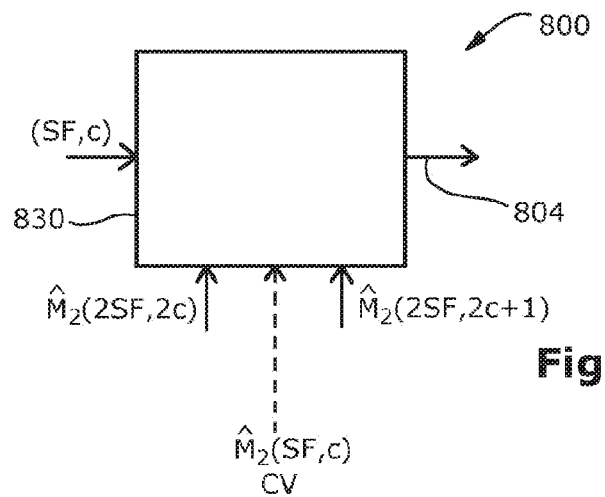
FIG. 8 is a block diagram illustrating an exemplary implementation of a channelization code analyzer.

FIG. 8 illustrates an exemplary implementation of a channelization code analyzer 800. Similar to the channelization code analyzer 400 the channelization code analyzer 800 may be configured to identify active channelization codes from a plurality of candidate channelization codes.

The channelization code analyzer 800 comprises a channelization code identification unit 830. The channelization code identification unit 830 may be configured to determine whether a specific channelization code (SF,c) is an active channelization code or a non-active channelization code. To that end, the specific channelization code (SF,c) is input into the channelization code identification unit 830. Further, a signal power $\hat{M}_2(2SF,2c)$ of a first descendant channelization code (2SF,2c) of the specific channelization code (SF,c) and a signal power $\hat{M}_2(2SF,2c+1)$ of a second descendant channelization code (2SF,2c+1) of the specific channelization code (SF,c) are fed to the channelization code identification unit 830. The channelization code identification unit may be configured to output an active code identification signal 804 indicating whether or not the specific channelization code (SF,c) under consideration is active or inactive.

It is to be noted that the channelization code identification unit 830 is an exemplary implementation of the channelization code identification unit 430 of channelization code analyzer 430. That is, the specific channelization code (SF,c) input into the channelization code identification unit 830 may be a channelization code pre-selected by the first predetermined modulation scheme detector 420. On the other hand, the channelization code analyzer 800 may operate on all candidate channelization codes as provided by the plurality of despreaded signals 402. In this case, the channelization code analyzer may be similar to the channelization code analyzer 400 except that the predetermined first modulation scheme detector 420 is omitted.

Channelization code identification unit 830 may be configured to operate on a criteria that the difference (e.g. in absolute value) of the power of the two immediate child codes (2SF,2c), (2SF,2c+1) of the specific channelization code (SF,c) relative to the power of the specific channelization code (SF,c) itself should be sufficiently small, namely less than a given threshold. In fact, for an active code it can be shown that the expected value of the power of both the child codes is equal to half the power of the code itself. Therefore, the channelization code identification unit 830 may apply the following equation $$\frac{|\hat{M}_2[2 \cdot SF, 2 \cdot c] - \hat{M}_2[2 \cdot SF, 2 \cdot c + 1]|}{\hat{M}_2[SF, c]} < Threshold_{delta} \cdot CV, \quad (5)$$

where $Threshold_{delta}$ is a suitable chosen empirical constant and CV is a criterion variable which depends on the criterion chosen for discriminating active and inactive channelization codes.

According to a first criterion, the criterion variable CV may be set CV=wh². The quantity wh² is the squared magnitude of the main tap of the impulse response of the channel-equalizer cascade filter. Since wh² is proportional to the SINR at the equalizer output, this criterion provides a SINR-dependent "modulation" of the decision threshold $Threshold_{delta}$.

It is also possible to set CV proportional to SINR, with the value of SINR may be derived from another quantity than the channel-equalizer impulse response wh.

According to a second criterion, the criterion variable CV may be based on the spreading factor SF of the channelization code under investigation. By way of example, CV may be set to be proportional to $SF^{1/2}$. In particular, the criterion variable CV may be set to be proportional to $(SF/N_c)^{1/2}$, wherein $N_c$ is the number of chips over which the signal power of the first and second child codes (2SF,2c), (2SF,2c+1) is estimated.

More specifically, this criterion may be expressed by $$\frac{|\hat{M}_2[2 \cdot SF, 2 \cdot c] - \hat{M}_2[2 \cdot SF, 2 \cdot c + 1]|}{\hat{M}_2[SF, c]} < Threshold_{delta} \cdot \sqrt{\frac{SF}{1280}}, \quad (6)$$

wherein $Threshold_{delta}$ is a suitably chosen constant that maps the desired confidence level. E.g., $Threshold_{delta}$=2.5 for, e.g., a 2.5-σ or 98.85% confidence level. The number 1280 in equation (6) reflects the number of chips $N_c$ within the M2 averaging window (here, for example, one half-slot). Equation (6) may be derived from the statistical distribution of the difference between the estimated second moments of the child codes, i.e. from the numerator of the left-hand side ratio in equation (6). It can be shown that this random quantity is (approximately) Gaussian distributed with mean and variance equal to $$\hat{M}_2[2 \cdot SF, 2 \cdot c] - \quad (7)$$
$$\hat{M}_2[2 \cdot SF, 2 \cdot c + 1] \sim N\left(m = 0, \sigma^2 = \left(X_0^2 + \frac{\sigma_n^2}{SF}\right)^2 \cdot \frac{SF}{1280}\right),$$

where $X_0^2$ is the signal power and $\sigma_n^2$ is the noise variance (for, e.g., Nc=2180).

Taking into account the standard deviation of $\hat{M}_{2n}$ [2·SF, 2·c]–$\hat{M}_{2n}$ [2·SF, 2·c+1], the detection criterion may be derived as:

$$|\hat{M}_2[2 \cdot SF, 2 \cdot c] - \hat{M}_2[2 \cdot SF, 2 \cdot c + 1]| < \quad (8)$$
$$Threshold_{delta} \cdot \left(X_0^2 + \frac{\sigma_n^2}{SF}\right) \cdot \sqrt{\frac{SF}{1280}} \cong$$
$$Threshold_{delta} \cdot \hat{M}_2[SF, c] \cdot \sqrt{\frac{SF}{1280}}$$

A further refinement of the criterion can be applied to HS-PDSCH codes (SF=16, c=1 . . . 15). In this case, taking into account that active HS-PDSCH codes are transmitted by the base station at constant power for one sub-frame (6 consecutive half-slots), the quantity $\hat{M}_{2children\ avg}$ (16,c)=$\hat{M}_2$ [32,2·c]–$\hat{M}_2$ [32,2·c+1] can be averaged within one sub-frame to reduce the decision threshold and consequently to improve the detection selectivity. The averaging should be restarted at the beginning of each sub-frame (HS-PDSCH sub-frames have a fixed relationship to the cell timing and therefore their boundaries are known to the UE):

$$\Delta \hat{M}_{2\ children\ avg}[16, c, v] = \frac{1}{v+1} \cdot \sum_{i=0}^{v-1} \{\hat{M}_2[32, 2 \cdot c, i] - \hat{M}_2[32, 2 \cdot c + 1, i]\} \quad (9)$$

$$= \frac{1}{v+1} \cdot \left\{ \sum_{i=0}^{v-1} \hat{M}_2[32, 2 \cdot c.i] - \sum_{i=0}^{v-1} \hat{M}_2[32, 2 \cdot c + 1, i] \right\}$$

$$= \hat{M}_{2\ avg}[32, 2 \cdot c, v] - \hat{M}_{2\ avg}[32, 2 \cdot c + 1, v],$$

$$c = 1 \ldots 15, v = 0 \ldots 5$$

where v is the half-slot index within the current sub-frame and c is the code index. Since, in general, averaging of a random quantity over N observations reduces its standard deviation σ by a factor of $1/\sqrt{N}$, the threshold used in the detection criterion can be scaled at each half-slot by $1/\sqrt{v}$, to improve the selectivity and reduce the probability of false alarms at SF=16:

$$\frac{|\Delta \hat{M}_{2\ children\ avg}[16, c]|}{\hat{M}_2(16, c)} < \frac{Threshold_{delta}}{\sqrt{v}} \cdot \sqrt{\frac{SF}{1280}}, \quad (10)$$

$$c = 1 \ldots 15, v = 0 \ldots 5$$

The $\hat{M}_2$ values provided e.g. every half-slot to the channelization code identification unit 830 may be normalized by the gain of the channel-equalizer prior to averaging in order to account for time variations of this parameter. However, simulations showed in many cases negligible or only small improvement effected by such normalization to the system level performance even for fast changing channels like VA30 and/or VA120. Therefore, to reduce the computational complexity, the normalization of the $\hat{M}_2$ values input to channelization code identification unit 830 may be omitted.

The introduction of the above criterion (CV is proportional to the square root of SF), optionally in conjunction with sub-frame averaging for channelization codes of SF=16, resulted in improved code detection reliability and data throughput compared to the previous empirical formula of equation (5). More specifically, approximately 0.6% average throughput improvement (and up to 2.4% improvement in specific test scenarios) has been observed in simulations by the criterion relying on a threshold proportional to the square root of SF compared to the empirical criterion approach, while the computational complexity of the improved criterion is comparable to the one of the empirical criterion.

Figure 9:
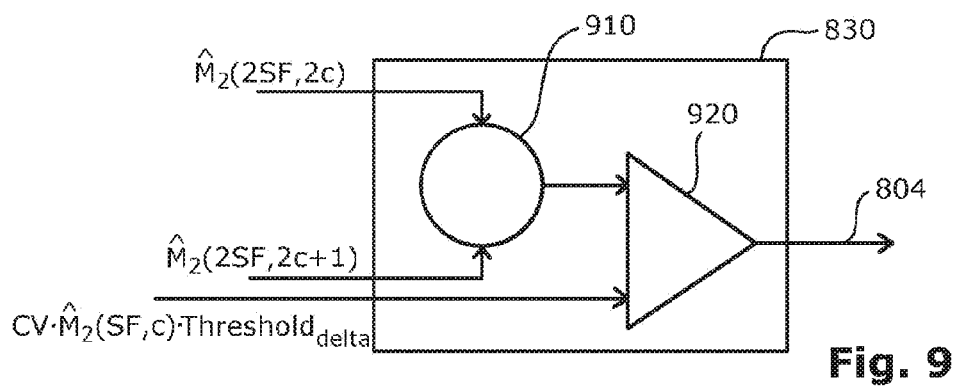
FIG. 9 is a block diagram illustrating an exemplary implementation of the channelization code analyzer of FIG. 8.

FIG. 9 illustrates, by way of example, an exemplary implementation of the channelization code identification unit 830 of the channelization code analyzer 800 of FIG. 8. The channelization code identification unit 830 may comprise a subtractor 910 and a comparator 920. The subtractor 910 may be configured to compute the numerator of the left-hand ratio in equations (5) or (6). The comparator 920 may be configured to compare the subtraction result with the threshold dependent on the criterion applied and outputs the active code identification signal 804.

Simulations have been performed to verify the active code identification performance in simulated HSDPA test cases. The test cases were defined to represent typical cell-edge scenarios with a single dominant interferer. The test suite included the standard fading profiles PA3, PB3, VA30 and VA120. For each of them 81 tests were defined with serving cell Ior/Ioc ranging from +3 dB down to −3 dB, DIP (Dominant Interferer Proportion) values from −0.5 dB to −4.5 dB and varying number and modulation of the HS-PDSCH codes transmitted by serving and interfering cells. Two code and power allocation scenarios, denoted as "Base" and "Full Codes" scenarios, were defined to verify the robustness of the code detection algorithm. The "Base" scenario, besides CPICH and P-CCPCH, included only HSDPA data and control channels. The "Full Codes" scenario included in addition Rel99 (3GPP Release 1999 of March 2000 (closed June 2011)) channels and is therefore regarded as more realistic.

Figure 10:
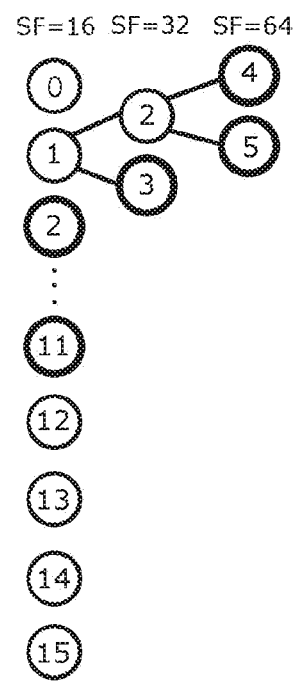
FIG. 10 is an exemplary illustration of a partial section of a spreading code tree.

FIG. 10 and Table 2 below illustrate a simulation example corresponding to the "Full Codes" scenario: the codes with SF=16, c=2 . . . 11, SF=32, c=3, and SF=64, c=4, 5 correspond to active codes, the residual codes are inactive ones. A static code allocation was used, namely the code tree was assumed to be constant for the whole test duration (e.g. 10000 sub-frames). Table 2 reports the detection statistics obtained with the first criterion (criterion 1: according to equation (5)) and the second criterion (criterion 2: according to equation (6)). The test conditions were PA3 fading profile, Ior/Ioc=0 dB, DIP1=−1.5 dB. As can be seen, the detection criterion 2 reduces the number of false detections of channelization code (16,1) and reduces correspondingly the missing detections of codes (32,3), (64,4) and (64,5). The detection of codes (16,2, . . . , 11) is almost the same for detection criterion 1 and detection criterion 2. In this particular test case the data throughput with detection criterion 2 improved by approximately 1% over the data throughput with detection criterion 1.

TABLE 2

| SF, c | Criterion 1 | Criterion 2 |
|---|---|---|
| 16, 0 | 0.0% | 0.0 |
| 16, 1 | 99.3% | 27.0% |
| 16, 2 | 97.6% | 97.1% |
| 16, 3 | 97.6% | 97.0% |
| 16, 4 | 97.5% | 97.1% |
| . . . | | |
| 16, 11 | 97.9% | 97.6% |
| 16, 12 | 4.5% | 4.6% |
| . . . | | |
| 16, 15 | 3.8% | 3.9% |
| . . . | | |
| 32, 2 | 0.1% | 1.7% |
| 32, 1 | 0.2% | 69.6% |
| . . . | | |
| 64, 4 | 0.1% | 70.2% |
| 64, 5 | 0.1% | 70.1% |

According to a further aspect, the time correlation of the channels activity could be exploited to improve the detection reliability and/or the reconstruction at chip level of the active channels. More specifically, enhanced $M_2/M_4$ estimation and active code identification schemes may exploit the fact that channelization codes typically are transmitted by the base station over a time window spanning a number of consecutive half-slots. For instance, HS-PDSCH channels are transmitted at constant power at least for six consecutive half-slots, with known slot boundaries. On the other hand, some other channels, e.g. some of the Rel99 channels, remain active at least for 30 half-slots, although with varying transmit power and unknown slot boundaries. These specific time behaviors could be exploited to identify active channels.

Figure 11:
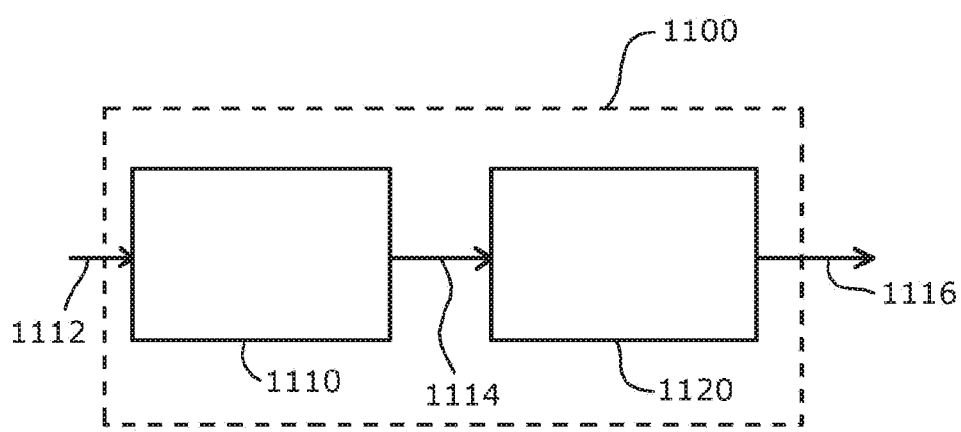
FIG. 11 a block diagram illustrating an exemplary implementation of a second moment and fourth moment processing unit.

Referring to FIG. 11, an exemplary second moment and fourth moment processing unit 1100 may comprise a second moment and fourth moment estimator 1110 and an averaging unit 1120.

The second moment and fourth moment estimator 1110 may receive a HS-PDSCH signal 1112 which may be obtained by despreading a received signal with a HS-PDSCH channelization code. The second moment and fourth moment estimator 1110 may be configured to estimate $M_2$ and $M_4$ of the input despreaded HS-PDSCH signal 1112 on a regular time scale of consecutive time intervals. That is, each time interval one measurement of $M_2$ and one measurement of $M_4$ may be obtained, thereby generating sequences 1114 of second moments and fourth moments.

By way of example, the time interval considered here may be a half-slot, e.g., 1280 chips.

The sequences 1114 of estimated second moments $\hat{M}_2$ and estimated fourth moments $\hat{M}_4$ are input into the averaging unit 1120. The averaging unit 1120 may be configured to average N second moments of the sequence of estimated second moments for generating one average second moment and may be configured to average N fourth moments of the sequence of estimated fourth moments for generating one average fourth moment. N is an integer greater than 1. In other words, the averaging unit 1120 may use an averaging window of N time intervals. By way of example, given the time interval corresponds to a half-slot, N may be 6. In this case, the averaging window covers one complete HS-PDSCH sub-frame.

Since at every sub-frame the base station may activate/deactivate channelization codes and/or may change their power level, the averaging should be restarted at the beginning of every sub-frame. This may be written as:

$$\hat{M}_{2\,avg}[16, c, v] = \frac{1}{v+1} \cdot \sum_{i=0}^{v-1} \hat{M}_2[16, c, i], \quad (11)$$

$$c = 1 \ldots 15, v = 0 \ldots 5,$$

where v is the half-slot index within the current sub-frame and c is the channelization code index.

A similar equation applies to the averaging of the estimated fourth moments $\hat{M}_4$.

The "smoothing" effect of the $\hat{M}_2$ and $\hat{M}_4$ averaging increases linearly at increasing half-slot index v within the sub-frame. For instance, on the last half-slot of each sub-frame, the random variability of $\hat{M}_2$ and $\hat{M}_4$ is expected to improve by $\approx 10 \cdot \log_{10}(6) = 7.8$ dB, respectively.

The averaging unit 1120 outputs the averaged second moment $\hat{M}_{2\,avg}$ and the averaged fourth moment $\hat{M}_{4\,avg}$. These averaged values 1116 may then be passed on to other processing instances of any of the devices mentioned above. By way of example, the averaged values 1116 (averaged second moments $\hat{M}_{2\,avg}$ and averaged fourth moment $\hat{M}_{4\,avg}$) could be used for interference cancellation, for channelization code search and/or channelization code identification, for modulation detection or for code power estimation, etc.

The averaging, e.g. sub-frame averaging, does not only help the detection of the active channelization codes, but may also improve their modulation detection and their power estimation. By way of example, simulations revealed that $M_2/M_4$ sub-frame averaging improved the reliability of the modulation detection of active channelization codes at Ec/Ioc=0 dB by approximately 10%.

According to another aspect, the persistency of channels, e.g. the HS-PDSCH channel, over a specific time period, e.g. a sub-frame, can be exploited to further enhance the reliability of their (active code) detection. The method described below may be particularly helpful when the SNR (signal-to-noise ratio) of the channelization codes during the $M_2/M_4$ measurement is poor.

Figure 12:
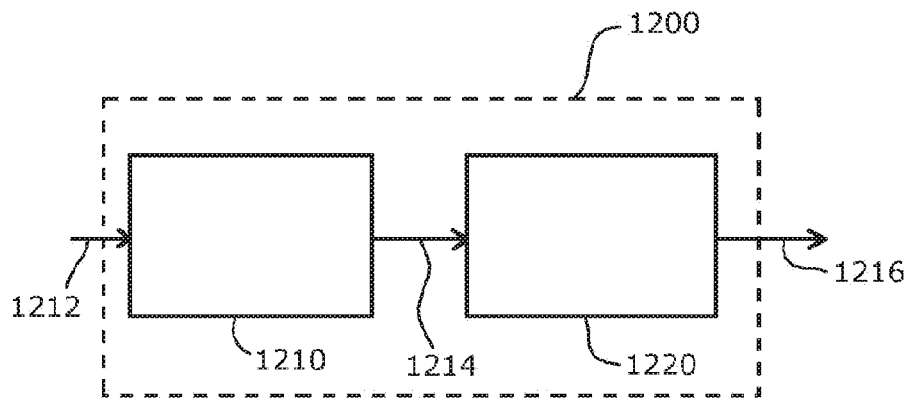
FIG. 12 a block diagram illustrating an exemplary implementation of a channelization code analyzer including a decision correlation unit.

Referring to FIG. 12, a channelization code analyzer 1200 for detecting active channelization codes may comprise a preliminary channelization code identification unit 1210 and a decision correlation unit 1220. The preliminary channelization code identification unit 1210 may be configured to decide for each time interval of a sequence of time intervals whether a specific channelization code is an active channelization code or a non-active channelization code, thereby generating a sequence of preliminary decisions 1214 related to the specific channelization code. It is to be noted that the preliminary channelization code identification unit 1210 may be configured similar to any of the aforementioned channelization code identification units, e.g. to channelization code analyzer 400 and/or to channelization code identification unit 430 and/or to channelization code identification unit 830. Thus, an input 1212 to the preliminary channelization code identification unit 1210 may be a de-channelized (e.g. despread) signal.

The sequence of preliminary decisions 1214 may be input to the decision correlation unit 1220. The decision correlation unit 1220 may be configured to determine whether the specific channelization code is an active channelization code or a non-active channelization code by evaluating the sequence of preliminary decisions 1214.

Byway of example, evaluating the sequence of preliminary decisions 1214 in the decision correlation unit 1220 may rely on majority voting applied to the sequence of preliminary decisions 1214. By using majority voting on the detection results of the preliminary channelization code identification unit 1210, it is possible to correct sporadic false or missing detections in the remaining part of the sequence of preliminary decisions 1214.

For example, the sequence of preliminary decisions 1214 may cover a sub-frame and the channelization code on which the preliminary decisions 1214 are generated may have spreading factor SF=16. For example, a pseudo-code which implements the majority voting logic could be implemented as follows:

```
UsedCode[v] = DetectCode(M2,M4,v) ;
if (UsedCode[v] == ACTIVE)
{
   NumDetected[v]++;
}
if (HalfSlotIdx >= 3)
{
   if (NumDetected[v] >= 3)
   {
      UsedCode[v] = ACTIVE;
   }
   if (NumDetected[v] <= HalfSlotIdx-3)
   {
      UsedCode[v] = NOT_ACTIVE;
   }
}
``` wherein v=1 . . . 15 is the SF=16 code index, DetectCode (M2,M4,v) denotes the generic $M_2/M_4$-based code detection routine, UsedCode[v] is the detection result, NumDetected [v] is the number of successful detections of code v within the current HS-PDSCH sub-frame and HalfSlotIdx is the half-slot counter (modulo 6) aligned to the sub-frame boundaries.

According to this logic, in a first part of the sub-frame (here, e.g., in the first 3 half-slots of each sub-frame) the decisions are taken solely based on the applicable detection criteria (e.g. second moment $M_2$ of the channelization code, $M_2$ difference of the child channelization codes). On a second part of the sub-frame (here, e.g. in the half-slots #3, #4 and #5), as soon as a HS-PDSCH code is detected for the first part (here, e.g., 3 half-slots (out of 6)) within the current sub-frame, any further detection result within the same sub-frame is overruled and the channelization code is forced as ACTIVE. Alternatively, if a code is not detected for the first part (e.g. 3 half-slots (out of 6)) within the sub-frame, then any further detection result is overruled and the channelization code is forced as NOT_ACTIVE. The result of majority voting is provided at output 1216 of the decision correlation unit 1220 and may represent the output of channelization code analyzer 1200.

The approach of majority voting applied on a sequence of preliminary channelization code identification decisions may be extended to channelization codes other than SF=16 as well. In particular, as mentioned earlier, Rel99 channelization codes are expected to persist for one complete radio frame (30 consecutive half-slots), or more. Since, however, the frame boundaries of Rel99 channels are not known to the receiver, it is not possible to apply the same scheme as for the HS-PDSCH codes (with SF=16 and known frame and slot boundaries). Nevertheless, accepting a certain number of false or missing detections at the beginning and at the end of such frames (e.g. Rel99 frames), a sliding window approach may be adopted to "low-pass filter" the channelization code identification decisions and discard sporadic wrong decisions.

For example, a history of N past decisions, either positive meaning that the channelization code under investigation is active or negative meaning that the channelization code under investigation is non-active, may be maintained. Then, it is possible to apply majority voting and overrule the current decision in case it differs from the one that most frequently occurred during the past N−1 decisions (the Nth decision is the current decision, each decision may, e.g., be taken during one half-slot).

Increasing the length N of the sliding window is equivalent to narrow the bandwidth of the low-pass filter, which improves the detection reliability in case of static code allocation. On the other hand, larger N increases the delay of the filter response at the frame boundaries, in case a channelization code is switched on or off by the base station. In addition, a longer sliding window N means larger data memory footprint and increased processing load for the CPU (central processing unit), e.g., DSP or microcontroller that runs this algorithm.

Figure 13:
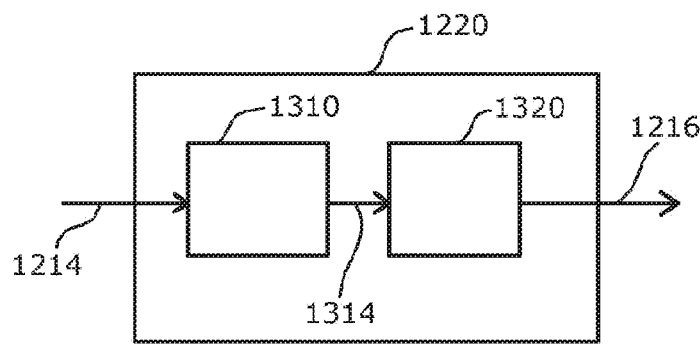
FIG. 13 is a block diagram illustrating an exemplary implementation of the decision correlation unit of FIG. 12 based on majority voting.

FIG. 13 illustrates an exemplary implementation of such algorithm in a decision correlation unit 1220. Exemplary decision correlation unit 1220 may comprise a FIFO (first-in first-out) memory 1310 and a majority voting unit 1320. The FIFO may be allocated to hold the current and the N−1 past decisions for the specific channelization code or, if a plurality of channelization codes are under investigation, for all these channelization codes, e.g. all channelization codes of the OVSF tree or all candidate channelization codes as defined earlier (1 bit per code). The FIFO may, e.g., have a capacity of N×32×16 bit words. At each half-slot, a pointer to the top of the FIFO is maintained and incremented modulo N to generate the modulo N half-slot index x. The oldest decisions are discarded and replaced by the result of the detection criteria in the current half-slot:

$$DetectionHistory[x-N]=Detection[x];$$

$$x=(x+1) \bmod N; \qquad (12)$$

This detection history, continuously updated and maintained in the FIFO 1310, may be accessed, on a code-by-code basis, by the majority voting unit 1320 via data connection 1314. the majority voting unit 1320 may apply for each channelization code a majority voting among the N detection decisions stored in the FIFO 1310.

Taking, for example N=5, the majority voting unit 1320 may be configured to compute the majority voting by the following logic operation:

$$\begin{aligned}DetectionActual[x] = \quad & (13)\\
& DetectionHistory[x-0] \cdot DetectionHistory[x-1] \cdot \\
& DetectionHistory[x-2] + DetectionHistory[x-0] \cdot \\
& DetectionHistory[x-1] \cdot DetectionHistory[x-3] + \\
& DetectionHistory[x-0] \cdot DetectionHistory[x-1] \cdot \\
& DetectionHistory[x-4] + DetectionHistory[x-0] \cdot \\
& DetectionHistory[x-2] \cdot DetectionHistory[x-3] + \\
& DetectionHistory[x-0] \cdot DetectionHistory[x-2] \cdot \\
& DetectionHistory[x-4] + DetectionHistory[x-0] \cdot \\
& DetectionHistory[x-3] \cdot DetectionHistory[x-4] + \\
& DetectionHistory[x-1] \cdot DetectionHistory[x-2] \cdot \\
& DetectionHistory[x-3] + DetectionHistory[x-1] \cdot \\
& DetectionHistory[x-2] \cdot DetectionHistory[x-4] + \\
& DetectionHistory[x-1] \cdot DetectionHistory[x-3] \cdot \\
& DetectionHistory[x-4] + DetectionHistory[x-2] \cdot \\
& DetectionHistory[x-3] \cdot DetectionHistory[x-4]\end{aligned}$$

where x is the current half-slot index (modulo N), "·" denotes logical AND, and "+" denotes logical OR.

For each channelization code under investigation, the result of the majority voting denoted as DetectionActual[x] may be output by majority voting unit 1320 as the active code/non-active code decision 1216.

Summarizing the approaches above, i.e. $M_2/M_4$ averaging and/or code identification decision history evaluation may both improve the identification of active channelization codes and thus improve the overall performance of the UE, which may use this improved active code/non-active code information for various different purposes such as, e.g., interference cancellation.

Figure 14:
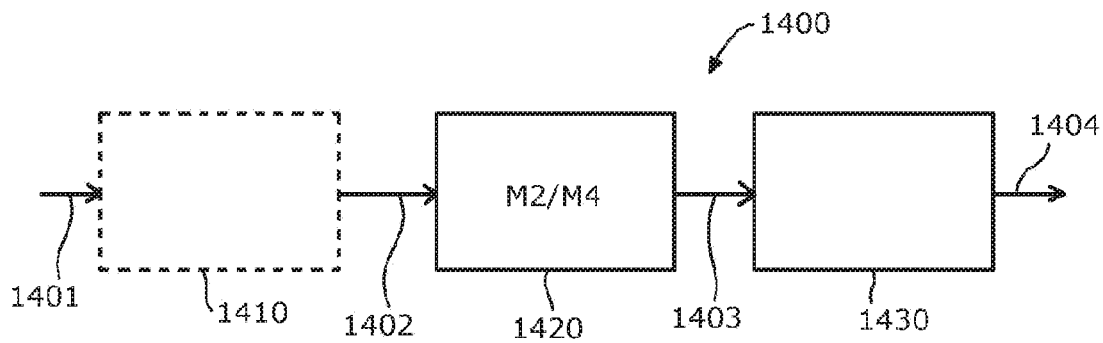
FIG. 14 is a block diagram illustrating an exemplary implementation of a modulation scheme detector.

FIG. 14 illustrates a block diagram of a modulation scheme detector 1400. The modulation scheme detector 1400 may comprise a second moment and fourth moment estimator 1420 configured to estimate the second moment $\hat{M}_2$ and the fourth moment $\hat{M}_4$ of a de-channelized signal 1402 and an evaluation unit 1430.

The second moment and the fourth moment of the de-channelized signal 1402 may be provided by signal 1403 output from the second moment and fourth moment estimator 1420. The evaluation unit 1430 may receive the signal 1403 of the second moment and fourth moment estimator 1420 and may be configured to decide a modulation scheme used to modulate the de-channelized signal 1402 when channelized and transmitted by a transmitter (e.g. base station). The evaluation unit 1430 outputs a modulation indicator signal 1404 indicating which modulation scheme was decided by the evaluation unit 1230. The modulation indicator signal 1404 may be binary if the evaluation unit 1430 does only have to decide between two modulation schemes, e.g. QPSK and 16-QAM. The modulation indicator signal 1404 may adopt more than two values if more than two, e.g. three modulation schemes (e.g. QPSK, 16-QAM, 64-QAM) may be used to modulate the de-channelized signal 1402 when channelized and transmitted by a transmitter (e.g. base station).

The modulation scheme detector 1400 may optionally comprise a despreading unit 1410 configured to despread a received signal 1401 by a channelization code to generate the de-channelized (i.e. despread) signal 1402. However, since channelization techniques other than spreading may be used, the de-channelized signal 1402 may also be generated by means other than despreading unit 1410.

Despreading unit 1410 may correspond to despreading unit 410. The second moment and fourth moment estimator 1420 may correspond to second moment and fourth moment estimator 424. Thus, all features described in conjunction with units 410, 424 may equally apply to units 1410 and 1420, respectively. In particular, the second moment and fourth moment estimator 1420 may be implemented in software or in hardware and may estimate the second moment and the fourth moment of the despreaded signal 1402 every time interval, e.g. every half-slot.

Further, the second moment and fourth moment estimator 1420 may be configured to correspond to the second moment and fourth moment processing unit 1110 as described above. That is, the second moment and fourth moment estimator 1420 may comprise the second moment and fourth moment estimator 1110 followed by the averaging unit 1120 configured to average N second moments and N fourth moments estimated by the second moment and fourth moment estimator 1110. In this case, the output signal 1403 may correspond to the averaged second moment $\hat{M}_{2\ avg}$ and the averaged fourth moment $\hat{M}_{4\ avg}$ as generated by averaging unit 1120 of the second moment and fourth moment processing unit 1100.

Figure 15:
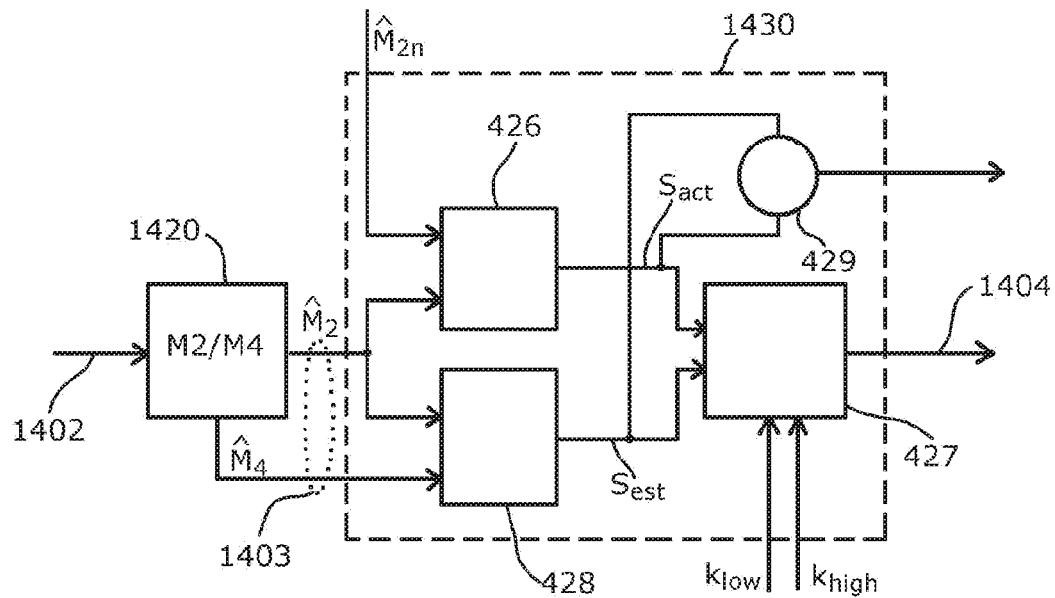
FIG. 15 is a block diagram illustrating an exemplary implementation of a second moment and fourth moment estimator.

FIG. 15 illustrates a block diagram of an exemplary implementation of the evaluation unit 1430. The evaluation unit 1430 may comprise a first signal power estimator 426, a second signal power estimator 428, a comparator 427 and, optionally, a distance metric unit 429. All these units have been described before, and reference is made to the description above in order to avoid reiteration.

Byway of example, without loss of generality, the signal 1402 may be a signal transported by the HS-PDSCH channel. Such signal may, e.g., be modulated by QPSK, 16-QAM or 64-QAM modulation schemes. In the following these three modulation schemes are denoted as XMS=0, 1, 2, respectively. This notation corresponds to the notation used in 3GPP. The modulation scheme detector 1400 may be configured to detect the modulation scheme (XMS) used to modulate the signal 1402.

To that end, an estimate of the noise power ($\hat{M}_{2n}$) at the equalizer output is received by first signal power estimator 426. As mentioned before, the noise power estimates $\hat{M}_{2n}$ may be obtained in various ways. For example, the noise power estimates $\hat{M}_{2n}$ may be derived from despreaded CPICH symbols using a maximum likelihood estimator or by means of an $M_2/M_4$ estimator applied to the CPICH channelization code (SF=256,c=0) according to equation (1).

Further, low-pass filtering and/or other post-processing methods such as, e.g., averaging may be used to enhance the accuracy of the noise power estimates $\hat{M}_{2n}$.

The modulation detection algorithm implemented in the evaluation 1430 may be configured to select the most likely among the three possible hypotheses: QPSK (XMS=0), 16-QAM (XMS=1) and 64-QAM (XMS=2). The selection criterion may be based on comparing the estimated signal power obtained with the two following equations:

$$S_{act} = \hat{M}_2 - \hat{M}_{2n}$$

$$S_{est} = k \cdot \sqrt{2 \cdot \hat{M}_2^2 - \hat{M}_4}. \quad (14)$$

Equation (14) is similar to equation (2) except that the scaling factor k has been introduced in the formula yielding $S_{est}$. It can be seen that the scaling factor k is related to the kurtosis $k_a$ of the noiseless despreaded symbols x of the signal 1402 by $$k_a \triangleq \frac{E\{|x|^4\}}{E\{|x|^2\}^2} = \frac{M_4}{M_2^2} \quad (15)$$

$$k = \frac{1}{\sqrt{2 - k_a}}.$$

Further, it can be shown that the scaling factor k is a function of the modulation scheme used for modulating symbols x:

$$QPSK: \quad k_a = 1 \quad \rightarrow \quad k = 1 \quad (16)$$

$$16-QAM: \quad k_a = 2 - 0.68 = 1.32 \quad \rightarrow \quad k = \frac{1}{\sqrt{0.68}} = 1.213$$

$$64-QAM: \quad k_a = 2 - \frac{13}{21} = 1.381 \quad \rightarrow \quad k = \frac{1}{\sqrt{\frac{21}{13}}} = 1.271$$

Based on the above equations, the most likely hypothesis $X\hat{M}S$ may be chosen to be the one that minimizes the distance between $S_{act}$ output by first signal power estimator 426 and $S_{est}$ output by second signal power estimator 428, or, equivalently between $S_{act}^2$ and $S_{est}^2$:

$$X\hat{M}S: \min_k\{|S_{act}^2 - S_{est}^2|\} = \min_k\{|(\hat{M}_2 - \hat{M}_{2n})^2 - k^2 \cdot (2 \cdot \hat{M}_2^2 - \hat{M}_4)|\}. \quad (17)$$

One possibility to formulate the selection criterion is given by $$S_{est\ 0}^2 \triangleq 2 \cdot \hat{M}_2^2 - \hat{M}_4$$

$$S_{act}^2 < k_{low} \cdot S_{est\ 0}^2 \rightarrow X\hat{M}S = QPSK$$

$$k_{low} \cdot S_{est\ 0}^2 \leq S_{act}^2 \leq k_{high} \cdot S_{est\ 0}^2 \rightarrow X\hat{M}S = 16\text{-QAM}$$

$$S_{act}^2 > k_{high} \cdot S_{est\ 0}^2 \rightarrow X\hat{M}S = 64\text{-QAM} \quad (18)$$

wherein the decision thresholds $k_{low}$ and $k_{high}$ may, for example, be chosen as $$k_{low} = \frac{1}{2} \cdot \left(1 + \frac{1}{0.68}\right) = 1.235 \quad (19)$$

-continued $$k_{high} = \frac{1}{2} \cdot \left(\frac{1}{0.68} + \frac{21}{13}\right) = 1.543$$

It is to be noted that the above values of $k_{low}$ and $k_{high}$ are exemplary and could, e.g., each vary within tolerances of equal to or less than ±0.05, ±0.1, ±0.15, ±0.2.

In some cases it may be sufficient to distinguish between only two modulation schemes. By way of example, if the receiver does not support soft-symbol generation for 64-QAM, or for other reasons, it may be sufficient to distinguish between, e.g., QPSK and 16-QAM modulation schemes only. In this case, the modulation detection algorithm may be simplified in accordance with $$S_{act}^2 < k_{low} \cdot S_{est}^{o^2} \rightarrow X\hat{M}S = \text{QPSK}$$

$$S_{act}^2 \geq k_{low} \cdot S_{est}^{o^2} \rightarrow X\hat{M}S = 16\text{-QAM}. \quad (20)$$

Further, it is possible that the comparator 427 may be configured to operate on more than two decision thresholds in order to distinguish between more than three modulation schemes.

Figure 16:
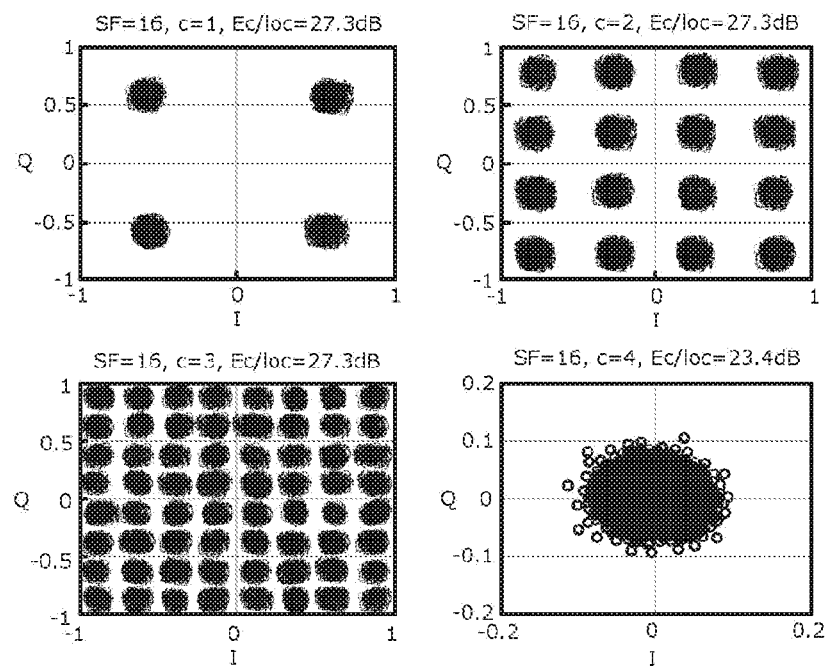
FIG. 16 shows quadrature versus in-phase representations of despreaded signals for four different spreading codes (SF,c)

FIG. 16 illustrates a simulation example of a code tree with three active HS-PDSCH codes, namely (16,1,QPSK), (16,2,16-QAM) and (16,3,64-QAM). In the simulations each code has a power of ⅓ and Ior/Ioc is set to 20 dB.

It is apparent from FIG. 16 that the constellations of the active codes (16,1,QPSK), (16,2,16-QAM), (16,3,64-QAM) are reproduced well whereas the inactive HS-PDSCH code (16, 4,inactive) has a constellation plot which does not correspond to any of the possible modulation schemes.

The quantities that play a role in the modulation detection are reported in the table below.

TABLE 3

| SF, code | $k_a = \hat{M}_4/\hat{M}_2^2$ | $S_{act}^2 = (\hat{M}_2 - \hat{M}_{2n})^2$ | $S_{est}^2 = 2 \cdot \hat{M}_2^2 - \hat{M}_4$ | $k^2 = S_{act}^2/S_{est}^2$ | XMS |
|---|---|---|---|---|---|
| 16, 1 | 1.004 | 0.111 | 0.111 | 1.000 | QPSK |
| 16, 2 | 1.322 | 0.111 | 0.076 | 1.470 | 16-QAM |
| 16, 3 | 1.379 | 0.111 | 0.071 | 1.604 | 64-QAM |
| 16, 4 | 2.007 | 0.000 | 0.000 | N/A | N/A |

It is apparent that the algorithm would correctly identify the modulation of the three active codes. However, it is to be noted that the simulation may assume a longer averaging window for $M_2$ and $M_4$ estimation as compared to the real system. In reality, if, e.g., a smaller averaging window of, e.g., one half-slot is used and if, e.g., a lower Ior/Ioc may be envisaged (e.g. 3 dB or less in typical use cases), incorrect modulation scheme detections may occur. In these and other cases, the modulation scheme detections may be subjected to an additional processing, e.g., to a majority voting processing as described above, in order to provide a higher reliability to the modulation scheme detection process.

Figure 17:
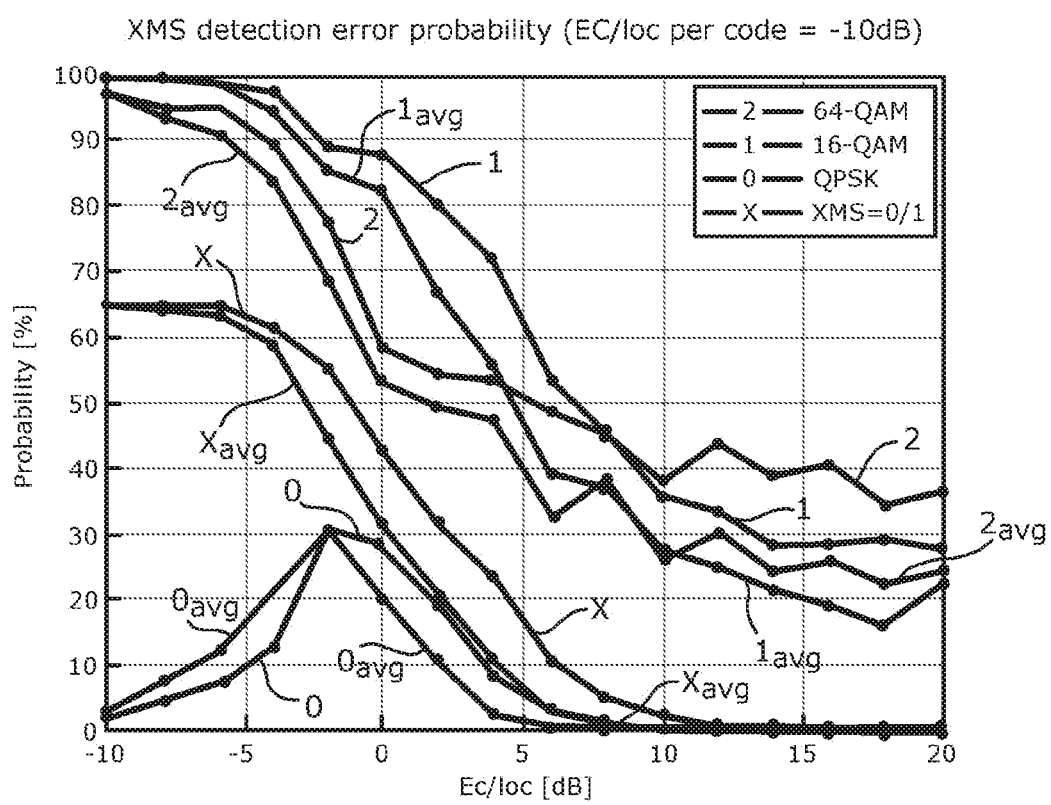
FIG. 17 is a graph illustrating the reliability of the modulation detection algorithm for various Ec/Ioc in units of dB.

FIG. 17 illustrates the reliability of the modulation detection algorithm for various Ec/Ioc in units of dB. Ec/Ioc is the per-code SNR. A fixed-point algorithm is used. Modulation detection reliabilities with $M_2/M_4$ sub-frame averaging (subscript "avg") and without $M_2/M_4$ sub-frame averaging (without subscript) are shown.

As apparent in FIG. 17, the modulation detection error probability XMS (denoted by X, if based on averaged quantities: $X_{avg}$) decreases at increasing Ec/Ioc. At very low SNR, the estimator is biased towards QPSK decision (XMS=0), since in these conditions, both $S_{act}$ and $S_{est}$ become basically zero. It is to be noted that, while the detection of QPSK against higher order modulation (XMS=1 or 2) is quite reliable already at Ec/Ioc of 5 dB, distinguishing 16-QAM (XMS=1) from 64-QAM (XMS=2) is hard even at high levels of Ec/Ioc. This is due to the relatively low number of symbols over which $M_2$ and $M_4$ are estimated, namely in this simulation, one half-slot. The benefit of the sub-frame averaging is also visible in the plot. For example, at Ec/Ioc=0 dB the reliability of the XMS=0/1 detection, i.e. the detection of the QPSK modulation versus non-QPSK modulation, improves by approximately 10%.

EXAMPLES

The following examples pertain to further embodiments.

Example 1 is a channelization code analyzer for determining active channelization codes, comprising a despreading unit configured to despread a received signal by a plurality of candidate channelization codes to generate a plurality of despreaded signals; a detector configured to detect from the plurality of despreaded signals those despreaded signals modulated with a predetermined modulation scheme; and a channelization code identification unit configured to identify at least one active channelization code from the candidate channelization codes based on the detected set of despreaded signals.

In Example 2, the subject matter of Example 1 can optionally include wherein the detector comprises a noise power measurement unit configured to measure a total noise power of the received signal.

In Example 3, the subject matter of any of Examples 1-2 can optionally include wherein the detector comprises a second moment and fourth moment estimator configured to output for each despreaded signal the second moment and the fourth moment.

In Example 4, the subject matter of Example 3 can optionally include wherein the detector further comprises a first signal power estimator configured to compute a first signal power based on the second moment and the total noise power.

In Example 5, the subject matter of any of Examples 3-4 can optionally include wherein the detector further comprises a second signal power estimator configured to compute a second signal power based the second moment and on the fourth moment.

In Example 6, the subject matter of Examples 4 and 5 can optionally include wherein the detector further comprises a comparator configured to determine whether or not the predetermined modulation scheme is detected based on the first signal power, the second signal power and a decision threshold value.

In Example 7, the subject matter of Example 6 can optionally include wherein the detector further comprises a soft decision output stage configured to output a reliability of whether or not the predetermined modulation scheme is detected based on the first signal power and the second signal power.

In Example 8, the subject matter of any of Examples 1-7 can optionally include wherein the detector further comprises wherein the channelization code identification unit is configured to identify a specific channelization code of a detected despreaded signal as an active channelization code by comparing a signal power of a first descendant channelization code of the specific channelization code with a signal power of a second descendent channelization code of the specific channelization code.

Example 9 is a radio receiver apparatus comprising the channelization code analyzer of claim 1; a serving cell detector configured to generate a detected serving cell signal based on a serving cell detector input signal; an interfering cell detector configured to generate a detected interfering cell signal based on an interfering cell detector input signal and on the active channelization codes determined by the channelization code analyzer; an interfering cell synthesizer configured to generate a synthesized interfering cell signal based on the detected interfering cell signal; and a serving cell interference removing unit configured to remove the synthesized interfering cell signal from a serving cell signal to generate the serving cell detector input signal.

In Example 10, the subject matter of Example 9 can optionally include wherein the interfering cell detector further comprises an interfering cell despreader configured to despread the interfering cell detector input signal by the active channelization codes determined by the channelization code analyzer.

Example 11 is a channelization code analyzer for determining active channelization codes, comprising a channelization code identification unit configured to determine whether a specific channelization code is an active channelization code or a non-active channelization code by evaluating a signal power of a first descendant channelization code of the specific channelization code and a signal power of a second descendent channelization code of the specific channelization code.

In Example 12, the subject matter of Example 11 can optionally include wherein the channelization code identification unit includes a subtractor configured to subtract the signal power of the first descendant channelization code from the signal power of the second descendent channelization code; and a comparator configured to compare a quantity based on the result of the subtraction with a comparison threshold.

In Example 13, the subject matter of Example 12 can optionally include wherein the comparison threshold is based on a signal-to-interference plus noise ratio of a received signal.

In Example 14, the subject matter of any one of Examples 12-13 can optionally include wherein the comparison threshold is based on a spreading factor of the specific channelization code.

In Example 15, the subject matter of Example 14 can optionally include wherein the comparison threshold comprises a constant multiplied by the square root of a ratio of the spreading factor and a number of chips over which the signal powers of the first and second descendent channelization codes are estimated.

Example 16 is a second moment and fourth moment processing unit, comprising a second moment and fourth moment estimator configured to estimate the second moment and the fourth moment of a signal despreaded with a specific channelization code for consecutive time intervals of a sequence of time intervals, thereby generating a sequence of estimated second moments and a sequence of estimated fourth moments; and an averaging unit configured to determine an average a plurality of estimated second moments of the sequence of estimated second moments for generating one averaged second moment and to determine an average of plurality of estimated fourth moments of the sequence of estimated fourth moments for generating one averaged fourth moment.

In Example 17, the subject matter of Example 16 can optionally include wherein the time interval corresponds to a half-slot.

In Example 18, the subject matter of any one of Examples 16-17 can optionally include wherein the signal is a HS-PDSCH signal.

In Example 19, the subject matter of any one of the Examples 17-18 can optionally include wherein the plurality of estimated second moments of the sequence of estimated second moments and the plurality of estimated fourth moments of the sequence of estimated fourth moments is 6, respectively.

In Example 20, the subject matter of Example 17 can optionally include wherein the plurality of estimated second moments of the sequence of estimated second moments and the plurality of estimated fourth moments of the sequence of estimated fourth moments is equal to or greater than 30, respectively.

Example 21 is a radio receiver apparatus, comprising the second moment and fourth moment processing unit of Example 16; and a channelization code analyzer for determining active channelization codes, wherein the channelization code analyzer is configured to operate on the averaged second moments and the averaged fourth moments.

Example 22 is a radio receiver apparatus, comprising the second moment and fourth moment processing unit of Example 16; and a modulation scheme detector for determining a modulation scheme of a received signal, wherein the modulation scheme detector is configured to operate on the averaged second moments and the averaged fourth moments.

Example 23 is a channelization code analyzer for determining active channelization codes, comprising a preliminary channelization code identification unit configured to decide for each time interval of a sequence of time intervals whether a specific channelization code is an active channelization code or a non-active channelization code, thereby generating a sequence of preliminary decisions related to the specific channelization code; and a decision correlation unit configured to determine whether the specific channelization code is an active channelization code or a non-active channelization code by evaluating the sequence of preliminary decisions.

In Example 24, the subject matter of Example 23 can optionally include wherein the decision correlation unit is configured to determine whether the specific channelization code is an active channelization code or a non-active channelization code by applying majority voting to the sequence of preliminary decisions.

In Example 25, the subject matter of any one of the Examples 23-24 can optionally include wherein the decision correlation unit comprises a memory configured to hold the current and the N−1 past preliminary decisions for the specific channelization code, or, if a plurality of channelization codes are under investigation, for all these channelization codes, wherein N is an integer equal to or greater than 2.

In Example 26, the subject matter Examples 25 can optionally include wherein N is dependent on the specific channelization code.

In Example 27, the subject matter of any one of the Examples 25-26 can optionally include wherein the specific channelization code is a HS-PDSCH channelization code, the time interval is one half-slot and N is fixed to an integer of at most 6.

In Example 28, the subject matter of any one of the Examples 25-26 can optionally include wherein the specific channelization code is other than a HS-PDSCH channelization code, the time interval is one half-slot and N is fixed to an integer of at most 30.

Example 29 is a modulation scheme detector, comprising a second moment and fourth moment estimator configured to estimate the second moment and the fourth moment of a de-channelized signal; and an evaluation unit configured to determine a modulation scheme used to modulate the de-channelized signal based on the second moment and on the fourth moment.

In Example 30, the subject matter of Example 29 can optionally include wherein the evaluation unit comprises a first signal power estimator configured to compute a first signal power based on the second moment; a second signal power estimator configured to compute a second signal power based on the second moment and on the fourth moment; and a comparator configured to decide by comparison based on the first signal power, the second signal power and at least one decision threshold value the modulation scheme.

In Example 31, the subject matter of Example 30 can optionally include wherein the at least one decision threshold value is variably programmable.

In Example 32, the subject matter of any one of the Examples 29-31 can optionally include a despreading unit configured to despread a received signal by a channelization code to generate the de-channelized signal.

In Example 33, the subject matter of any one of the Examples 29-32 can optionally include an averaging unit having an input connected to an output of the second moment and fourth moment estimator and having an output connected to an input of the evaluation unit, the averaging unit being configured to average a plurality of second moments and a plurality of fourth moments.

Example 34 is a method of analyzing channelization codes for determining active channelization codes, comprising despreading a received signal by a plurality of candidate channelization codes to generate a plurality of despreaded signals; detecting from the plurality of despreaded signals a set of despreaded signals modulated with a predetermined modulation scheme; and identifying the active channelization codes from the candidate channelization codes based on the detected despreaded signals.

In Example 35, the subject matter of Example 34 can optionally include wherein the method further comprises estimating a second moment and fourth moment for each despreaded signal.

In Example 36, the subject matter of Example 35 can optionally include wherein the method further comprises measuring the total noise power of the received signal; and computing a first signal power based on the second moment and the total noise power.

In Example 37, the subject matter of Example 35 or 36 can optionally include wherein the method further comprises computing a second signal power based on the second moment and on the fourth moment.

In Example 38, the subject matter of Example 37 can optionally include wherein the method further comprises determining a decision of whether or not the predetermined modulation scheme is detected based on comparing the first signal power, the second signal power and a decision threshold value.

In Example 39, the subject matter of Example 38 can optionally include wherein the method further comprises outputting a reliability of the decision of whether or not the predetermined modulation scheme is detected based on the first signal power and the second signal power.

In Example 40, the subject matter of Example 39 can optionally include wherein the method further comprises identifying a specific channelization code of a detected despreaded signal as an active channelization code by comparing a signal power of a first descendant channelization code of the specific channelization code with a signal power of a second descendent channelization code of the specific channelization code.

Example 41 is a method of determining active channelization codes, comprising determine whether a specific channelization code is an active channelization code or a non-active channelization code by evaluating a signal power of a first descendant channelization code of the specific channelization code and a signal power of a second descendent channelization code of the specific channelization code.

Example 42 is a method of processing second moments and fourth moments, comprising estimating a second moment and fourth moment of a signal despreaded with a specific channelization code for consecutive time intervals of a sequence of time intervals, thereby generating a sequence of estimated second moments and a sequence of estimated fourth moments; and averaging a plurality of estimated second moments of the sequence of estimated second moments for generating one averaged second moment and averaging a plurality of estimated fourth moments of the sequence of estimated fourth moments for generating one averaged fourth moment.

In Example 43, the subject matter of Example 42 can optionally include wherein the method further comprises determining active channelization codes by evaluating the averaged second moments and the averaged fourth moments.

In Example 44, the subject matter of Example 42 can optionally include wherein the method further comprises determining a modulation scheme of a received signal, wherein the modulation scheme detection is based on evaluating the averaged second moments and the averaged fourth moments.

Example 45 is a method of determining active channelization codes, comprising preliminarily deciding for each time interval of a sequence of time intervals whether a specific channelization code is an active channelization code or a non-active channelization code, thereby generating a sequence of preliminary decisions related to the specific channelization code; and determining whether the specific channelization code is an active channelization code or a non-active channelization code by evaluating the sequence of preliminary decisions.

In Example 46, the subject matter of Example 45 can optionally include wherein the method further comprises applying majority voting to the sequence of preliminary decisions for determining whether the specific channelization code is an active channelization code or a non-active channelization code.

Example 47 is a method of determining a modulation scheme, comprising estimating a second moment and a fourth moment of a de-channelized signal; and deciding a modulation scheme used to modulate the de-channelized signal based on the estimated second moment and on the estimated fourth moment.

In Example 48, the subject matter of Example 47 can optionally include wherein the method further comprises computing a first signal power based on the second moment; computing a second signal power based on the second moment and on the fourth moment; and deciding the modulation scheme by comparison based on the first signal power, the second signal power and at least one decision threshold value.

Although specific embodiments and examples have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of embodiments and examples described herein. Therefore, it is intended that this invention is limited only by the claims and the equivalents thereof.

The invention claimed is:

1. A channelization code analyzer for determining active channelization codes, comprising:
   a despreader configured to despread a received signal with a plurality of candidate channelization codes to generate a plurality of despreaded signals;
   a detector configured to detect from the plurality of despreaded signals a set of despreaded signals modulated with a predetermined modulation scheme, wherein the detector comprises:
      an estimator configured to estimate a total noise power of the received signal,
      wherein the detector is further configured to detect the set of despreaded signals based on the estimated total noise power; and
   a channelization code identifier configured to identify at least one active channelization code from the candidate channelization codes based on the detected set of despreaded signals.

2. The channelization code analyzer of claim 1, wherein the channelization code identifier is configured to identify a specific channelization code of a detected despreaded signal as an active channelization code by comparing a signal power of a first descendant channelization code of the specific channelization code with a signal power of a second descendent channelization code of the specific channelization code.

3. A radio receiver apparatus, comprising:
   the channelization code analyzer of claim 1;
   a serving cell detector configured to generate a detected serving cell signal based on a serving cell detector input signal;
   an interfering cell detector configured to generate a detected interfering cell signal based on an interfering cell detector input signal and on the active channelization codes determined by the channelization code analyzer;
   an interfering cell synthesizer configured to generate a synthesized interfering cell signal based on the detected interfering cell signal; and
   a serving cell interference remover configured to remove the synthesized interfering cell signal from a serving cell signal to generate the serving cell detector input signal.

4. The radio receiver apparatus of claim 3, wherein the interfering cell detector further comprises:
   an interfering cell despreader configured to despread the interfering cell detector input signal by the active channelization codes determined by the channelization code analyzer.

5. A channelization code analyzer for determining active channelization codes, comprising:
   a despreader configured to despread a received signal with a plurality of candidate channelization codes to generate a plurality of despreaded signals;
   a detector configured to detect from the plurality of despreaded signals a set of despreaded signals modulated with a predetermined modulation scheme, wherein the detector comprises:
      a second moment and a fourth moment estimator configured to output, for each despreaded signal, the second moment and the fourth moment,
      wherein the detector is further configured to detect the set of despreaded signals based on the second moment and the fourth moment; and
   a channelization code identifier configured to identify at least one active channelization code from the candidate channelization codes based on the detected set of despreaded signals.

6. The channelization code analyzer of claim 5, wherein the detector further comprises:
   a first signal power estimator configured to compute a first signal power based on the second moment and a total noise power of the received signal,
   wherein the detector is further configured to detect the set of despreaded signals based on the first signal power.

7. The channelization code analyzer of claim 6, wherein the detector further comprises:
   a second signal power estimator configured to compute a second signal power based on the second moment and the fourth moment,
   wherein the detector if further configured to detect the set of despreaded signals based on the second signal power.

8. The channelization code analyzer of claim 7, wherein the detector further comprises:
   a comparator configured to determine whether or not the predetermined modulation scheme is detected based on the first signal power, the second signal power and a decision threshold value.

9. The channelization code analyzer of claim 8, wherein the detector further comprises:
   a soft decision output stage configured to output a reliability of whether or not the predetermined modulation scheme is detected based on the first signal power and the second signal power.

* * * * *